Patented Sept. 18, 1945

2,385,075

UNITED STATES PATENT OFFICE 2,385,075

DETERGENT COMPOSITION

James Kenneth Gunther, Chicago, Ill., assignor to Industrial Patents Corporation, Chicago, Ill., a corporation of Delaware No Drawing. Application September 12, 1942, Serial No. 458,138

6 Claims. (Cl. 252—140)

This invention relates to a non-caking cleanser composition and method of making the same, and more particularly to the production of a composition containing powdered silica and a water-soluble alkali metal phosphate in which the particles will not substantially adhere together under usual conditions of storage or shipment.

One of the most commonly employed cleanser compositions at the present time is a powdered mixture of silica and trisodium phosphate containing approximately 60% or more of finely pulverized silica as an active abrasive, the trisodium phosphate acting as a mild alkali which cooperates with the abrasive to form a detergent composition which is particularly effective in removing films of dirt such as grease, insoluble metal soap and the like from various surfaces. Such mixtures tend to cake or lump when stored. This caking is probably caused by the formation of alkali silicates due to reaction between the silica and alkali metal phosphate in the presence of atmospheric moisture, which alkali silicates serve as binding agents between the particles.

In accordance with the present invention it has been discovered that dispersing powdered calcium silicate, particularly precipitated calcium silicate, in such cleanser compositions, effectively prevents caking of the powdered material. The action of the calcium silicate is not definitely known, but it is probable that it prevents the formation of the soluble silicates so that no binding agents are formed. Alkaline earth metal salts, in general, or even calcium salts in general, do not appear to have this property. The action of the calcium silicate may be at least partly physical, since calcium silicates prepared by processes other than precipitation from solution, are not as effective as precipitated calcium silicate.

It is, therefore, an object of the present invention to provide an improved powdered cleanser composition containing silica and a water-soluble alkali metal phosphate in which caking of the composition during storage is substantially absent.

Another object of the invention is to provide an improved cleanser composition containing powdered silica and powdered water-soluble alkali metal phosphate in which an active calcium silicate is employed to minimize caking of the composition.

Another object of the invention is to provide an improved process of making a powdered non-caking cleanser composition containing silica and alkali metal phosphate.

Other objects of the invention will appear in the following description of the preferred embodiments of the invention.

Cleanser compositions in accordance with the present invention are predominantly finely divided silica containing a powdered alkali metal phosphate. In general the alkali metal phosphate forms less than 30% of the mixture and is preferably employed in amounts between 2 and 25%. I have found that for the upper ranges of alkali metal phosphate, 1 to 5% of, and preferably 3 to 5%, of the mixture should be calcium silicate in order to effectively prevent caking. The amount of calcium silicate will depend somewhat upon the fineness of division of the calcium silicate, as the more finely this material is divided, the greater is its stabilizing action against caking. The amount of calcium silicate will also depend somewhat upon the conditions to which the final composition is to be subjected, compositions intended to be stored in extremely humid climates requiring a greater amount of calcium silicate. For cleansers containing alkali metal phosphate in the lower ranges given above, satisfactory results using as little as ½% of precipitated calcium silicate have been obtained. In general, calcium silicates other than precipitated calcium silicate, are not as active as the precipitated form and may require even greater amounts. Excesses of the calcium silicate do not harm, but have no advantages as they merely serve as a filler.

In general, the more finely divided the silica and alkali metal phosphate, the more desirable the cleanser product. It is desirable to employ the silica in extremely finely divided form as coarse silica particles are in general too harsh an abrasive. It is also desirable to employ the alkali metal phosphate in extremely finely divided form in order to increase the rate at which it goes into solution in water. In commercial cleanser compositions not containing a caking inhibitor, the degree of subdivision of the ingredient was limited since the caking tendencies increased as the particles were made smaller. It was, therefore, considered necessary to employ relatively coarse phosphate particles and even then caking occurred. Admixture of the calcium silicate with the cleanser composition enables extremely finely divided materials to be employed without caking.

In forming the cleanser composition of the present invention, the silica, alkali metal phosphate and calcium silicate may be ground separately and thereafter thoroughly admixed. It is, however, preferred to grind the alkali metal phosphate and calcium silicate together, also preferably after the addition of finely divided silica, so that the calcium silicate is intimately mixed with the ingredients of the cleanser composition. The important consideration is that the calcium silicate be finely divided and thoroughly dispersed throughout the composition.

While trisodium phosphate is the preferred alkali metal phosphate and the one usually employed in commercial cleansers, other water-soluble alkali metal salts such as sodium pyrophosphate, and equivalent potassium phosphates, or admixtures of various alkali metal phosphates, may be employed as the alkaline constituent of the cleanser composition. Compositions including finely divided silicate, water-soluble alkali metal phosphate and calcium silicate, have been found to be extremely effective cleansers and to withstand humid atmospheres or alternate humid and dry atmospheres over extended periods of time without appreciable adherence of the particles resulting in caking of the composition.

While I have disclosed the preferred embodiments of my invention, it is understood that the details thereof may be varied within the scope of the following claims.

I claim:

1. A substantially non-caking cleanser composition which comprises a mixture of a predominant amount of finely divided silica and a substantial amount but not in excess of about 30% by weight of a finely divided water-soluble alkaline alkali metal phosphate, said mixture normally tending to cake when stored in a humid atmosphere, and sufficient finely divided calcium silicate to substantially prevent said caking.

2. A cleanser substantially as described in claim 1 in which the calcium silicate is a finely divided precipitated product.

3. A cleanser composition comprising a predominant amount of finely divided silica, about 2 to 25% by weight of water-soluble alkaline alkali metal phosphate, and from about ½ to 5% by weight of finely divided calcium silicate.

4. A method of preventing caking of a mixture of a predominant amount of finely divided silica and a substantial amount but not in excess of about 30% by weight of water-soluble alkaline alkali metal phosphate, said mixture normally tending to cake when stored in a humid atmosphere, which comprises, dispersing in said mixture finely divided calcium silicate in sufficient amount to substantially prevent said caking.

5. A method substantially as described in claim 4 in which the amount of calcium silicate is about ½ to 5% by weight.

6. A method of preventing caking of a mixture of a predominant amount of finely divided silica and at least about 2% and not in excess of about 30% by weight of finely divided trisodium phosphate, said mixture normally tending to cake when stored in a humid atmosphere, which comprises, dispersing in said mixture a small amount of finely divided precipitated calcium silicate sufficient to substantially retard said caking.

JAMES KENNETH GUNTHER.